United States Patent
Moue

[11] Patent Number: 5,979,530
[45] Date of Patent: Nov. 9, 1999

[54] SEPARATOR SHEET-FEEDING APPARATUS

[75] Inventor: Shigenori Moue, Bangkok, Thailand

[73] Assignee: The Furukawa Battery Co., Ltd., Kawasaki, Japan

[21] Appl. No.: 09/167,283

[22] Filed: Oct. 7, 1998

Related U.S. Application Data

[62] Division of application No. 08/864,569, May 28, 1997.

[30] Foreign Application Priority Data

Jun. 7, 1996 [JP] Japan ...................... 8-146089

[51] Int. Cl.$^6$ .................. B32B 31/08; B32B 31/20
[52] U.S. Cl. .................. 156/548; 156/549; 156/553; 156/578
[58] Field of Search .................. 156/290, 291, 156/292, 295, 221, 222, 224, 226, 324, 442.1, 443, 547, 578, 548, 549, 553

[56] References Cited

U.S. PATENT DOCUMENTS

| | | |
|---|---|---|
| 2,687,446 | 8/1954 | Merrill . |
| 3,496,059 | 2/1970 | Rasmussen . |
| 3,716,434 | 2/1973 | Cook et al. . |
| 4,642,152 | 2/1987 | Chapin . |
| 5,350,477 | 9/1994 | Chevalier et al. . |
| 5,656,110 | 8/1997 | Herklotz et al. . |

FOREIGN PATENT DOCUMENTS

| | | |
|---|---|---|
| 0150816 A2 | 8/1985 | European Pat. Off. . |
| 29 20 261 | 11/1980 | Germany . |
| 36 17 841 A1 | 12/1987 | Germany . |
| 42 05 249 A1 | 8/1993 | Germany . |
| 195 21 022 A1 | 12/1996 | Germany . |

*Primary Examiner*—Sam Chaun Yao
*Attorney, Agent, or Firm*—Frishauf, Holtz, Goodman, Langer & Chick, P.C.

[57] ABSTRACT

A separator sheet is formed of a plastic material and has a number of ribs formed on one side thereof. The ribs extend in the direction in which the separator sheet is fed. The sheet is overlaid with a glass mat, and a laminated member obtained thereby is moved into the region between a pair of driving rolls. After being sandwiched by the driving rolls, the laminated member is fed into an envelope apparatus. In an adhesive coating step, a hot melt type adhesive is coated on one side of the glass mat. The adhesive is coated at portions C corresponding to the base sections between the ribs of the sheet, in such a manner that the coated adhesive forms a line extending in the longitudinal direction of the glass mat. In a stacking step, the sheet and the glass mat are stacked one upon the other. In the pressing step, the laminated member is sandwiched between the driving rolls, and the adhesive-coated portions of the glass mat are tightly pressed by the ribs provided on the circumferential surface of the driving roll. The ribs extend in the circumferential direction of the roll and are located at positions corresponding to the adhesive-coated portions.

4 Claims, 4 Drawing Sheets

SEPARATOR SHEET-FEEDING APPARATUS

This application is a division of 08/864,569 filed on May 28, 1997.

BACKGROUND OF THE INVENTION

The present invention relates to a method for feeding a separator sheet, which is for use as a separator in a lead-acid battery, to an envelope apparatus which works the separator sheet in the form of a bag. The present invention also relates to an apparatus for feeding such a separator sheet.

In a general lead-acid battery, electrodes obtained by impregnating lead-alloy grids with an active material, are inserted in a separator. The separator is formed of a plastic material, such as micro-porous polyethylene, and are shaped like a bag. The separator serves to separate the positive and negative electrodes from each other inside the cell. In addition, the separator prevents the positive and negative electrodes from short-circuiting to each other even if the active material sheds from the grids. A number of ribs are integrally formed on the inner wall of the separator. The ribs help improve the diffusion of the electrolyte solution and adjust the pressure exerted on the electrodes.

The electrodes are inserted in the separator as follows. First of all, a plastic sheet (a micro-porous polyethylene sheet), which is for use as a separator, is wound to form a roll, and fed into the envelope apparatus. The plastic sheet is cut such that the sheet portion located inside the envelope apparatus has a predetermined length. The sheet obtained thereby is curved in the shape of a "U", and electrodes are inserted in the "U"-shaped sheet. With the electrodes inserted, the right and left ends of the sheet are connected together by fusion or by mechanically applying pressure thereto. As a result, the sheet is worked as a separator which is in the form of a bag.

In recent years, a glass mat is often used with the separator for fixedly pressing the active material against a grid and for preventing the separator from oxidizing. The case where such a glass mat is used is shown in FIG. 3. As shown in this FIGURE, a plastic sheet 1 for use as a separator and a glass mat 2 are stacked one upon the other, thereby obtaining a laminated member 3. The laminated member 3 is made to pass through the region between a pair of driving rolls 4 and 5. By these rolls, the sheet 1 and glass mat 2 of the laminated member 3 are tightly pressed against each other. The rolls 4 and 5 are rotated such that the laminated member 3 is fed to an envelope apparatus 6.

The driving rolls 4 and 5, by which the laminated member 3 made up of the sheet 1 and the glass mat 2 is compressed and fed toward the envelope apparatus 6, have a smooth surface formed of metal or rubber. When the laminated member 3 guided by the driving rolls 4 and 5 has been fed into the envelope apparatus 6 by a predetermined length, it is cut by means of a cutter 7 in such a manner that the sheet portion inside the envelope apparatus 6 has that predetermined length. The sheet portion is curved in the shape of a "U", and electrodes are inserted in the "U"-shaped sheet portion. With the electrodes inserted, the right and left ends of the sheet portion are connected together by fusion or by mechanically applying pressure thereto. As a result, the sheet is worked as a separator which is in the form of a bag.

A separator provided with a glass mat is shown in FIGS. 4 and 5. As shown in these FIGURES, the glass mat 2 is received in the separator S worked in the form of a bag. The glass mat 2 is bent inside the separator S, and an electrode 9 is inserted between the facing portions of the bent glass mat 2.

The separator sheet 1 and the glass mat 2 are cut in the stacked state, so that they are the same in length. The laminated member 3 made up of the sheet 1 and the glass mat 2 is bent, with the glass mat 2 located radially inside. At that time, the glass mat 2 inevitably shifts in position with reference to the sheet 1 (i.e., the separator S) located radially outside. As a result, the end portions of the glass mat 2 are projected upward from the separator S, as indicated by the broken lines in FIG. 5.

If the glass mat 2 is partially projected upward from inside the separator S, it is likely that particles of an active material will be deposited over the projected part of the glass mat 2, resulting in short-circuiting. To prevent this undesirable phenomenon, it may be thought to bond the sheet 1 and glass mat 2 together by use of a hot melt type adhesive before they are fed to the envelope apparatus 6.

However, this thought does not provide a satisfactory solution to the problem. In the case where the sheet 1 and the glass mat 2 are merely coated with an adhesive, a certain time is required before the adhesive hardens. In order to wait for the adhesive to satisfactorily harden, it is necessary to lower the rate at which the laminated member 3 is fed into the envelope apparatus 6. Alternatively, it is necessary to provide a long sheet feeding section between the driving rolls and the envelope apparatus. Hence, the productivity is lowered or the facility is inevitably large in size.

BRIEF SUMMARY OF THE INVENTION

The present invention has been developed in an effort to solve the above problems, and one object of the invention is to provide a separator sheet-feeding method which speeds up the hardening of an adhesive and thereby enables a laminated member made up of a sheet and glass mat to be fed to an envelope apparatus with high efficiency.

According to the separator sheet-feeding method of the present invention, a separator sheet is formed of a plastic material and has a number of ribs formed on one side thereof. The ribs extend in the direction in which the separator sheet is fed. The sheet is overlaid with a glass mat, and a laminated member obtained thereby is moved into the region between a pair of driving rolls. After being sandwiched by the driving rolls, the laminated member is fed into an envelope apparatus. In order to attain the above-mentioned object, the method of the present invention comprises an adhesive coating step, a stacking step, and a pressing step. In the adhesive coating step, a adhesive is coated on one side of either the sheet or the glass mat. The adhesive is coated at portions corresponding to the base sections between the ribs of the sheet or glass mat, in such a manner that the coated adhesive forms a line extending in the longitudinal direction of the sheet or glass mat. In the stacking step, the sheet and the glass mat are stacked one upon the other. In the pressing step, the laminated member is sandwiched between the driving rolls, and the adhesive-coated portions of the sheet or glass mat are tightly pressed by means of ribs provided on the circumferential surface of at least one of the driving rolls. The ribs extend in the circumferential direction of the roll or rolls and located at positions corresponding to the adhesive-coated portions.

According to the method of the present invention, the adhesive spreads out and forms a thin layer. Since the adhesive in such a state hardens in a short time, it is not necessary to lower the rate at which the laminated member made up of the sheet and glass mat is fed into the envelope apparatus. Nor is it necessary to provide a long sheet-feeding section. Accordingly, the laminated member can be fed into the envelope apparatus with high efficiency, thus improving the productivity.

Another object of the present invention is to provide a separator sheet-feeding apparatus which allows an adhesive to harden in a short time and can therefore feed a laminated member made up of a sheet and a glass mat into an envelope apparatus with high efficiency.

To attain this object, the present invention provides a separator sheet-feeding apparatus which feeds a separator sheet to a working apparatus so as to work the sheet in the form of a bag, and which comprises: sheet feeding means for feeding the separator sheet toward the working apparatus; glass mat feeding means for feeding a glass mat to be laid on the separator sheet toward the working apparatus; adhesive coating means for coating an adhesive on a predetermined portion which is present on one surface of at least one of the sheet and glass mat and which extends in a direction toward the working apparatus; stacking means for stacking the sheet and the glass mat one upon the other; and pressing means for tightly pressing the sheet and glass mat against each other.

According to the present invention, the adhesive spreads out and forms a thin layer. Since the adhesive in such a state hardens in a short time, it is not necessary to lower the rate at which the sheet and the glass mat are fed. Nor is it necessary to provide a long sheet-feeding section. Accordingly, the laminated member made up of the sheet and the glass mat can be fed into the envelope apparatus with high efficiency, resulting in an improvement in the productivity.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described, referring to FIGS. 1 and 2.

Figure 1:
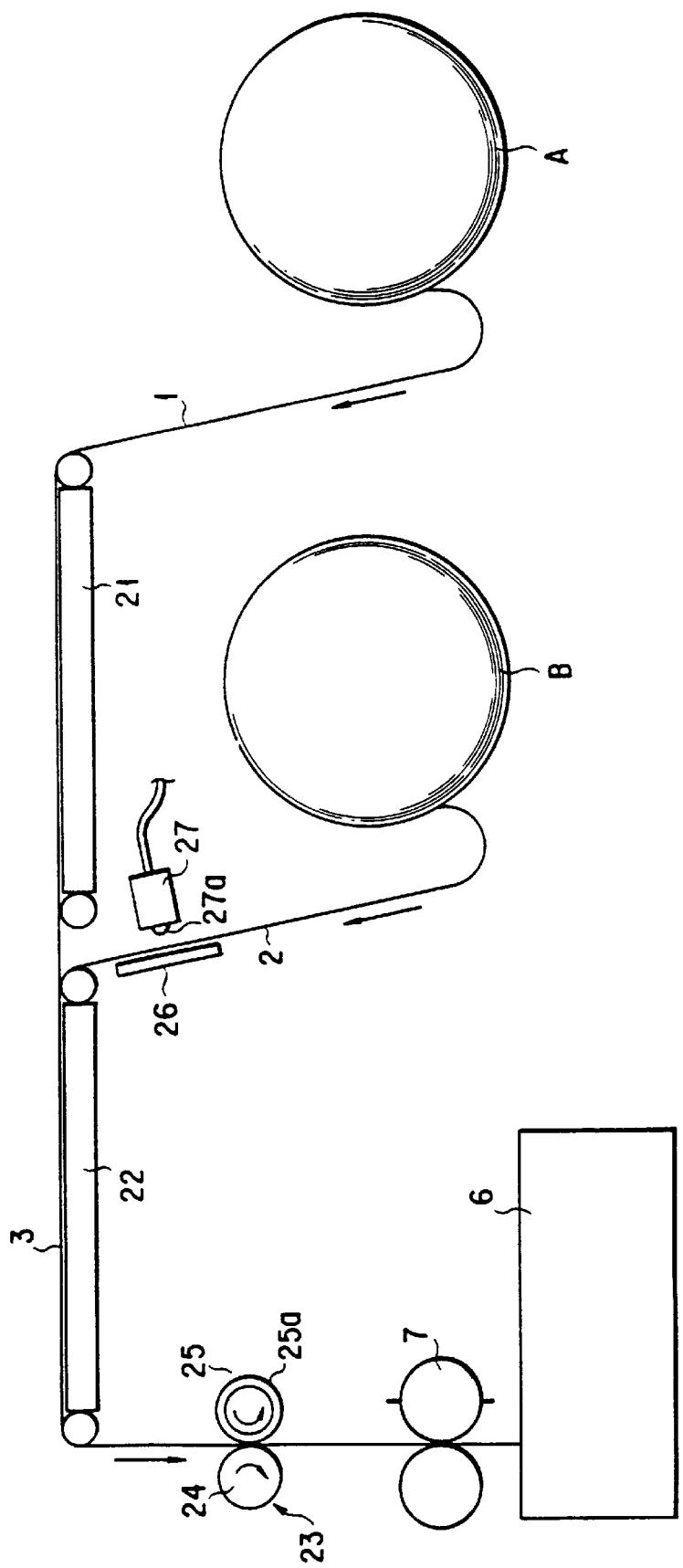
FIG. 1 shows a separator sheet-feeding apparatus according to one embodiment of the present invention.

FIG. 1 is a schematic illustration showing a separator sheet-feeding apparatus which feeds a separator sheet 1 (which is formed of micro-porous polyethylene or the like) and a glass mat 2 to an envelope apparatus. In FIG. 1, "A" denotes a roll obtained by winding the separator sheet 1, and "B" denotes a roll obtained by winding the glass mat 2.

Sheet 1 is delivered from roll A, and glass mat 2 is delivered from roll B. The sheet 1 and the glass mat 2 are made to travel along first and second conveyance guides 21 and 22, respectively. The first and second conveyance guides 21 and 22 are arranged in series with each other. The sheet 1 and the glass mat 2 are laid on each other on the second conveyance guide 22, thereby obtaining a laminated member 3. The laminated member 3 is guided into the region between a pair of driving rolls 24 and 25 and are compressed thereby. The laminated member 3 made up of the sheet 1 and the glass mat 2 is fed toward the envelope apparatus 6 with the rotation of the rolls 24 and 25.

Figure 2:
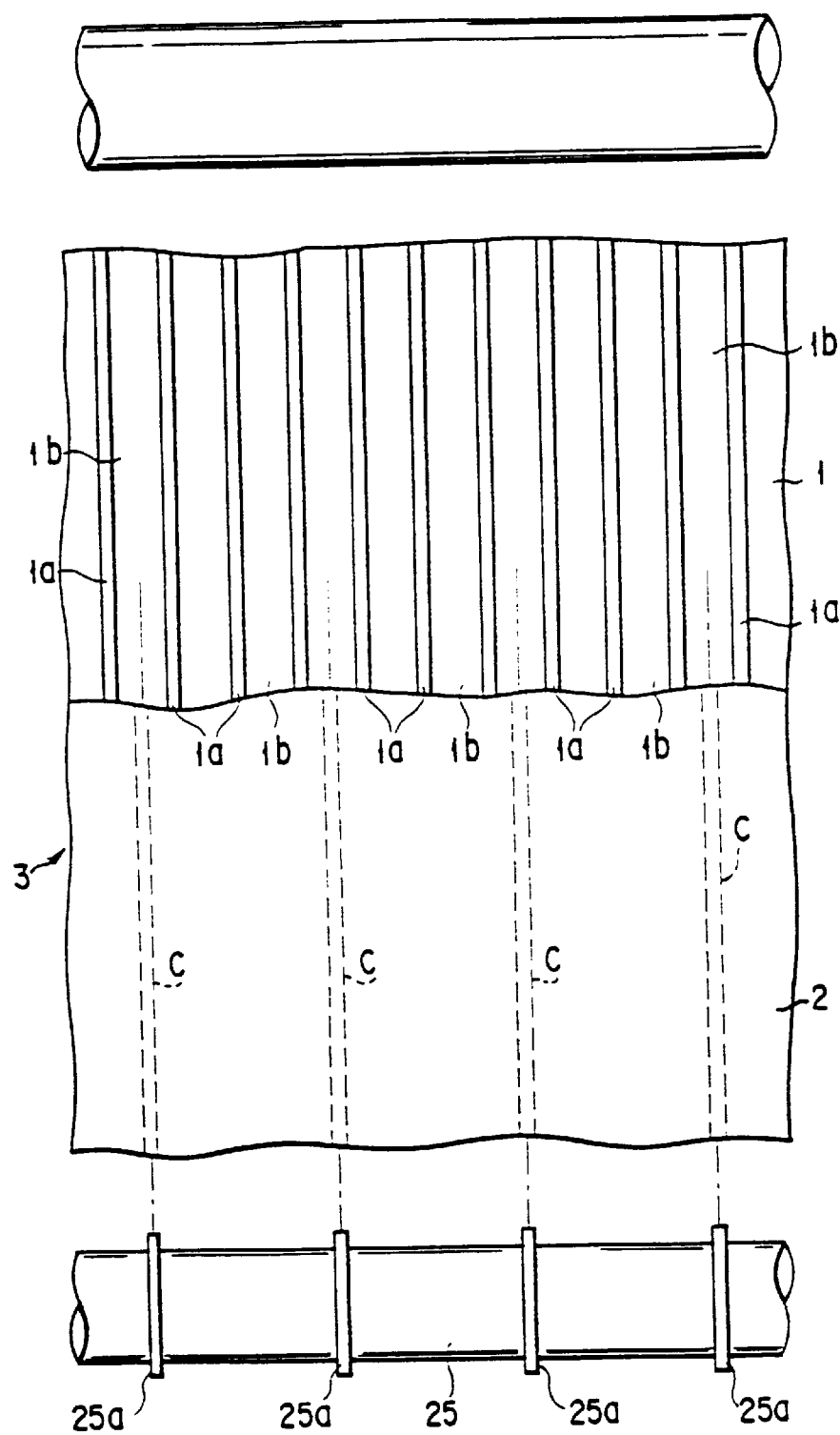
FIG. 2 is a schematic illustration showing how a sheet, a glass mat and a pair of driving rolls are associated with one another in the separator sheet-feeding method of the first embodiment of the present invention. The sheet, the glass mat and the driving rolls are depicted as if they were in the same plane.
Figure 3:
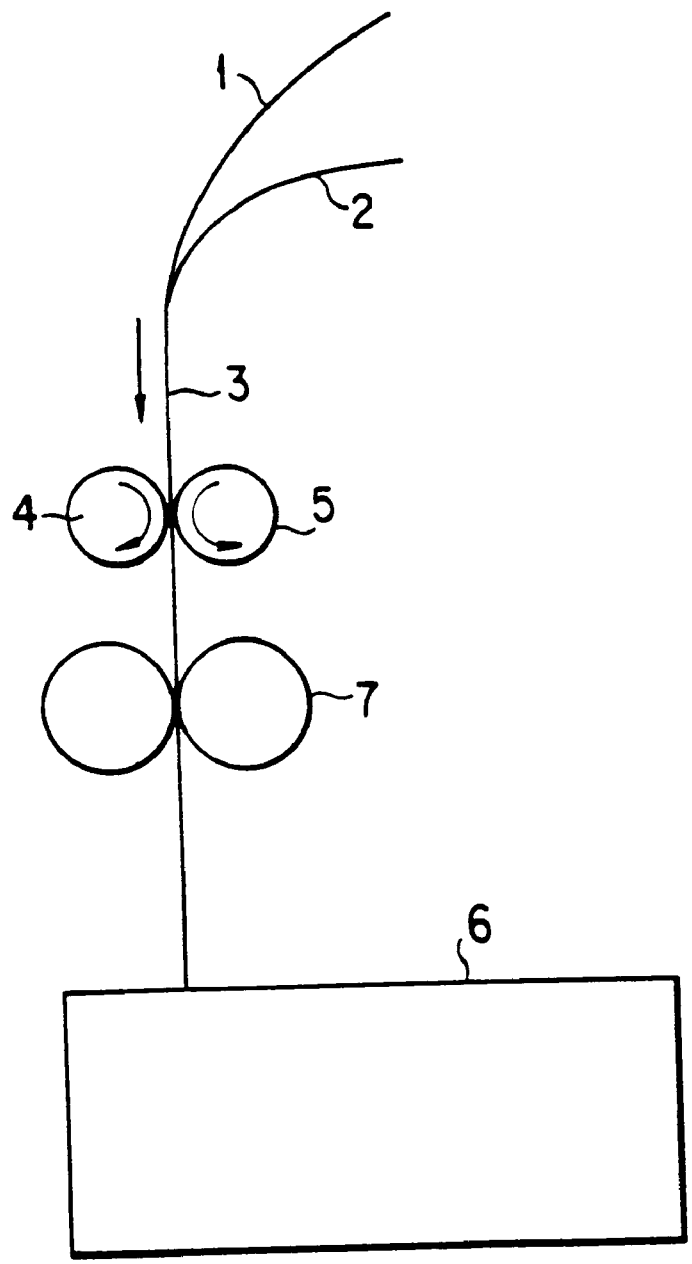
FIG. 3 shows a conventional separator sheet-feeding apparatus.
Figure 4:
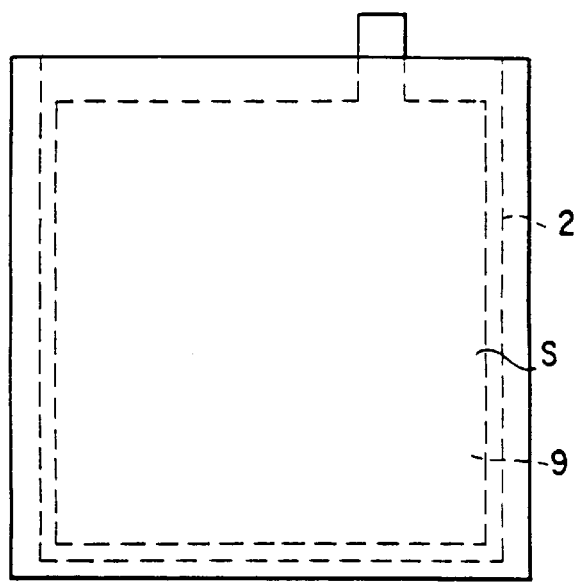
FIG. 4 is a front view of a separator which is worked in the form of a bag.
Figure 5:
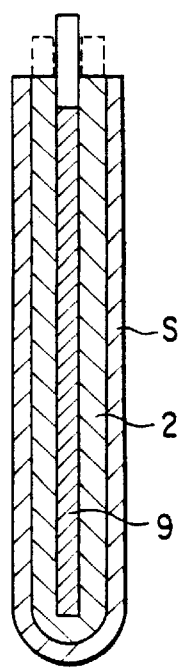
FIG. 5 is a sectional view of the separator.

FIG. 2 is a schematic illustration showing how the sheet 1, the glass mat 2 and the paired driving rolls 24 and 25 are associated with one another. In the schematic illustration, the sheet 1, the glass mat 2 and the driving rolls are depicted as if they were in the same plane.

A plurality of ribs (thick portions) 1*a* are integrally formed on one side of the sheet 1. The ribs 1*a* extend in the longitudinal direction of the sheet 1 and are spaced from each other by a predetermined distance. The regions between the ribs 1*a* are flat base sections 1*b*. The glass mat 2 is laid on that surface of the sheet 1 on which the ribs 1*a* are formed.

The paired driving rolls 24 and 25 jointly constitute a feeder 23. Of these two driving rolls 24 and 25, roll 24 has a smooth surface formed of metal or rubber. The other driving roll 25 has a plurality of ribs or projected portions 25*a*. The ribs or projected portions 25*a* are formed continuously in the circumferential direction of the roll 25 and spaced from each other. The ribs 25*a* of driving roll 25 are formed such that they face every three base sections 1*b* of the sheet 1.

The ribs 25*a* described above may be integral with the driving roll 25. Alternatively, they may be formed separately from the driving roll 25. To be specific, they may be formed of neoprene having a hardness of 75° to 80°, and such ribs are wound around the circumferential surface of the driving roll 25.

As shown in FIG. 1, a position adjuster 26 and a coating device 27 are provided in the neighborhood of the inlet end of the conveyance guide 22. The position adjuster 26 adjusts the position where the glass mat 2 is introduced into the conveyance guide 22. The coating device 27 coats an adhesive on the glass mat 2.

The coating device 27 comprises a nozzle 27*a* having an opening diameter of about 0.25 mm. From this nozzle 27*a*, a hot melt type adhesive, which is formed mainly of olefin (APP), is injected to predetermined portions of that side of the glass mat 2 which faces the sheet 1. For example, the adhesive is injected in such a manner that the glass mat 2 has four adhesive-injected linear portions corresponding in position to the ribs 25*a* of the driving roll 25. (The adhesive-injected linear portions or stripes are indicated by "C" in FIG. 2).

On the conveyance guide 22, the sheet 1 delivered from roll A and the glass mat 2 delivered from roll B are stacked one upon the other. The laminated member 3 obtained thereby is guided to the region between the driving rolls 24 and 25. After being compressed by the driving rolls 24 and 25, the laminated member 3 is fed into the envelope apparatus 6 in accordance with the rotation of the driving rolls 24 and 25.

Immediately before the glass mat 2 is introduced onto the conveyance guide 22, those portions of the glass mat 2 which are indicated by "C" in FIG. 2 are coated with a hot melt type adhesive injected from the nozzle 27a of the coating device 27. The adhesive is coated such that the coated portions are in the form of lines or stripes extending in the longitudinal direction of the glass mat 2. After being coated with the adhesive, the glass mat 2 is stacked on the sheet 1. The resultant laminated member 3 is guided into the region between the driving rolls 24 and 25 of the feeding device 23. The sheet 1 and the glass mat 2 are pressed against each other when they pass through the region between the driving rolls 24 and 25, with the result that they are bonded together.

Thereafter, the laminated member 3, coming out of the driving rolls 24 and 25, is fed into the envelope apparatus 6. When the laminated member 3 has been fed into the envelope apparatus 6 by a predetermined length (e.g., 24.6 cm), it is cut by means of a cutter 7 in such a manner that the sheet portion inside the envelope apparatus 6 has that predetermined length. The sheet portion is curved in the shape of a "U", and electrodes are inserted in the "U"-shaped sheet portion. With the electrodes inserted, the right and left ends of the sheet portion are connected together by fusion or by mechanically applying pressure thereto. As a result, the sheet portion is worked as a separator S in the form of a bag.

An adhesive is injected from the nozzle 27a of the coating device 27 such that the injected adhesive is in the form of a thread or stripes having a diameter of 1 mm. The adhesive injected in this manner is coated on the glass mat 2 when this glass mat 2 is moving.

Olefin (APP), which is the main ingredient of the adhesive, has a density of 0.7 g/cm$^3$, and the adhesive is coated on the glass mat 2 such that the coated adhesive forms four lines or stripes C. Therefore, the amount of adhesive needed for one separator S (i.e., a sheet having a length of 24.6 cm and worked in the form of a bag) is calculated as follows:

$$3.14 \times 0.1 \times 0.1 \times 24.6 \times 4 \times 0.7 \approx 2.2 \text{ (g/separator)}$$

Since the glass mat 2 and the separator S are bonded to each other by means of an adhesive, the glass mat 2 does not move relative to the separator S even when the laminated member 3 is folded in two, with the glass mat 2 radially inward. Therefore, the glass mat 2 does not project from the separator S.

When the laminated member 3 made up of the sheet 1 and the glass mat 2 is guided into the region between the driving rolls 24 and 25, the sheet 1 and the glass mat 2 are pressed tightly against each other at the adhesive-coated portions C of the glass mat 2 since the annular ribs 25a on the circumferential surface of driving roll 25 correspond in position to the adhesive-coated portions C.

As a result, the adhesive coated in the form of lines or stripes are squashed and spread, thus forming a thin layer between the sheet 1 and the glass mat 2. Since the adhesive is brought into contact with wide areas of the sheet 1 and glass mat 2, the time needed for the adhesive to harden is short. Where the amount of adhesive coated is 2.2 g, the adhesive hardens in about 10 seconds. Part of the adhesive spread on the glass mat 2 permeates into the interior of the glass mat 2.

If the sheet 1 and the glass mat 2 are not pressed against each other at the adhesive-coated portions, the coated adhesive remains in the form of thin rods and is in linear contact with the sheet 1 and the glass mat 2. A long time (about 21 seconds) is required for the internal portions of the adhesive to harden. In order to cope with this long hardening time, it is necessary to lower the feeding rate of the laminated member 3; alternatively, it is necessary to provide a long sheet-feeding section between the driving rolls 24 and 25 and the envelope apparatus 6. If the laminated member 3 is fed into the envelope apparatus 6 without waiting for the adhesive to harden, the separator S slips when the laminated member 2 is folded in two, thus producing creases.

According to the present invention, when the laminated member 3 made up of the sheet 1 and the glass mat 2 is made to pass through the region between driving rolls 24 and 25, the sheet 1 and the glass mat 2 are pressed tightly at the adhesive-coated portions by means of the ribs 25a of the driving roll 25. As a result, the adhesive coated in the form of lines spreads out and forms a thin layer. Owing to this, the adhesive-hardening time is short, and the sheet and the glass mat 2 are bonded reliably by means of the adhesive that hardens in a short time.

Accordingly, it is not necessary to lower the rate at which the laminated member 3 is fed into the envelope apparatus. Nor is it necessary to provide a long sheet-feeding section between the driving rolls 24 and 25 and the envelope apparatus 6. Therefore, the productivity is enhanced, and the facility is not large in scale.

In a normal case, the length of the sheet-feeding section is 130 cm. In order to allow 21 seconds for the hardening of the adhesive (a time length of 21 seconds is required in the case where the sheet 1 and the glass mat 2 are not pressed against each other), the feeding speed of the laminated member 3 has to be determined as follows:

$$(130/100) \div (21/60) = 37.1 \text{ (m/min)}$$

In the above embodiment of the present invention, the hardening time of the adhesive is as short as 10 seconds. Therefore, the feeding speed of the laminated member 3 is as follows:

$$(130/100) \div (10/60) = 7.8 \text{ (m/min)}$$

As can be seen from this, the laminated member 3 can be fed at a high rate.

It may be thought to coat an adhesive over the portions corresponding to the ribs 1a of the sheet 1. Since a transfer system has to be employed in this case, the entire apparatus is inevitably complex and large in size.

If the coating apparatus is complex and large in size, its installation space is restricted. The restriction in the installation space necessitates two manufacturing processes: a process wherein a glass mat coated with an adhesive by means of a coating device is laid over a sheet, and the resultant laminated member is wound by a winding apparatus; and a process wherein the laminated member delivered from the winding apparatus is supplied into an envelope apparatus. Due to these two manufacturing processes, the efficiency of production is inevitably low.

If the adhesive is coated over the portions corresponding to the base sections 1b of the sheet 1, the adhesive coating positions need not be controlled with high accuracy, and an ordinary type coating apparatus can be employed.

In the embodiment mentioned above, the ribs 25a are provided for the driving roll 25 which is brought into contact with the glass mat 2. However, this in no way restricts the present invention. For example, the driving roll which is brought into contact with the glass mat 2 may be formed to be smooth. In this case, the driving roll 24 which is brought into contact with the sheet 1 is provided with ribs. Moreover, the adhesive may be coated over the glass mat 2, instead of the sheet 1. In either case, the adhesive is coated in base sections which are located between the ribs 1b of the sheet 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A separator sheet-feeding apparatus for feeding a plastic sheet to a processing apparatus which processes the plastic sheet to have a bag structure, said sheet-feeding apparatus comprising:

sheet feeding means for feeding the sheet toward the processing apparatus;

glass mat feeding means for feeding a glass mat, which is to be stacked on the sheet, toward the processing apparatus;

adhesive coating means for coating an adhesive on separated predetermined portions of a stacking surface of the sheet, such that the coated adhesive in each separated portion extends in a feeding direction in which the sheet is fed toward the processing apparatus;

stacking means for stacking the sheet and the glass mat one upon the other so as to face each other, with the coated adhesive between the sheet and the glass mat; and pressing means for tightly pressing the stacked sheet and glass mat against each other, and wherein:

said sheet includes flat portions and at least one thick portion projected from those flat portions which are facing the glass mat, said at least one thick portion extending in the feeding direction of the sheet;

said adhesive coating means coats the adhesive on the flat portions of the sheet;

said pressing means includes a pair of driving rolls arranged to sandwich the sheet and the glass mat between the driving rolls and to drive the sheet and glass mat in said feeding direction; and at least one of said driving rolls includes:

a cylindrical portion rotatable in a direction corresponding to said feeding direction; and a plurality of projected portions which continuously extend outwardly from the cylindrical portion and in a circumferential direction of the cylindrical portion, each of said plurality of projected portions being spaced from each other along the axial direction of said at least one driving roll, said projected portions each being situated at a respective position corresponding to a predetermined flat portion of the sheet which is coated with the adhesive, and said projected portions each applying pressure to the sheet and the glass mat only at the respective adhesive-coated portions such that the applied pressure acts on the respective adhesive-coated portions and a neighboring portion of the sheet to spread out the coated adhesive into a thinner layer, thereby decreasing the hardening time of the adhesive.

2. An apparatus according to claim 1, wherein said adhesive coating means coats a hot melt adhesive on said predetermined portions of said sheet.

3. A separator sheet-feeding apparatus for feeding a plastic sheet to a processing apparatus which processes the plastic sheet to have a bag structure, said sheet-feeding apparatus comprising:

sheet feeding means for feeding the sheet toward the processing apparatus;

glass mat feeding means for feeding a glass mat, which is to be stacked on the sheet, toward the processing apparatus;

adhesive coating means for coating a hot melt adhesive on separated predetermined portions of a stacking surface of at least one of the sheet and glass mat, such that the coated adhesive in each separated portion extends in a feeding direction in which the sheet is fed toward the processing apparatus;

stacking means for stacking the sheet and the glass mat one upon the other so as to face each other, with the coated adhesive between the sheet and the glass mat; and pressing means for tightly pressing the stacked sheet and glass mat against each other, and wherein:

said sheet includes flat portions and at least one thick portion projected from those flat portions which are facing the glass mat, said at least one thick portion extending in the feeding direction of the sheet;

said adhesive coating means coats the adhesive on portions corresponding to the flat portions of the sheet;

said pressing means includes a pair of driving rolls arranged to sandwich the sheet and the glass mat between the driving rolls and to drive the sheet and glass mat in said feeding direction; and at least one of said driving rolls includes:

a cylindrical portion rotatable in a direction corresponding to said feeding direction; and a plurality of projected portions which continuously extend outwardly from the cylindrical portion and in a circumferential direction of the cylindrical portion, each of said plurality of projected portions being spaced from each other along the axial direction of said at least one driving roll, said projected portions each being situated at a respective position corresponding to a predetermined portion of the at least one of the sheet and glass mat which is coated with the adhesive, and said projected portions each applying pressure to the sheet and the glass mat at the respective adhesive-coated portions such that the applied pressure acts on the respective adhesive-coated portions and a neighboring portion of the sheet to spread out the coated adhesive into a thinner layer, thereby decreasing the hardening time of the adhesive.

4. An apparatus according to claim 3, wherein said adhesive coating means coats the adhesive on said flat portions of the sheet, and said projected portions are arranged so as to press only at positions corresponding to the flat portions of the sheet.

* * * * *